United States Patent [19]
Malinowski

[11] 3,887,149
[45] June 3, 1975

[54] RETRACTABLE PENDANT SUPPORT

[75] Inventor: William J. Malinowski, Philadelphia, Pa.

[73] Assignee: The United States of America as represented by the Secretary of the Navy, Washington, D.C.

[22] Filed: Oct. 2, 1974

[21] Appl. No.: 511,137

[52] U.S. Cl. .................................... 244/110 C
[51] Int. Cl. .................................... B64f 1/02
[58] Field of Search .................... 244/110 C, 110 R

[56] References Cited
UNITED STATES PATENTS

| | | | |
|---|---|---|---|
| 2,919,871 | 1/1960 | Sorensen | 244/110 C |
| 3,146,974 | 9/1964 | Petoia | 244/110 C |
| 3,148,849 | 9/1964 | Methven et al. | 244/110 C |
| 3,167,277 | 1/1965 | Cotton | 244/110 C |
| 3,428,275 | 2/1969 | Condodina et al. | 244/110 C |

Primary Examiner—Trygve M. Blix
Assistant Examiner—Paul E. Sauberer
Attorney, Agent, or Firm—R. S. Sciascia; Henry Hansen

[57] ABSTRACT

An elongated pendant support is secured to a rotatable table. The table is arranged to pivot 180° between either of two positions, a battery position and a down position. In the battery position the pendant support is raised above the runway surface. In the down position, the pendant support is withdrawn into a subsurface housing and the table forms the roof of the housing with the upper surface of the table positioned flush with respect to a surrounding runway surface. A locking pin controlled by a cam secures the table in either the battery position or the down position.

4 Claims, 2 Drawing Figures

RETRACTABLE PENDANT SUPPORT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to pendant supports and in particular to retractable pendant supports which are movable to and from a flush position with a runway surface.

In stopping an aircraft making a landing in a limited distance, it is common to stretch a cable, that is, a pendant, across the runway and engage it with a hook suspended from the aircraft. The span of the pendant is substantial and unless the pendant is supported at numerous points, it lies on the landing surface and cannot be readily grabbed by an aircraft arresting hook. On the other hand, a pendant that is raised above the landing surface, although it is satisfactory for arrestments, in an obstruction to traffic on the landing surface. Numerous prior art pendant supports have been devised to raise and lower the pendant from and to the runway surface. However, many of these supports presented obstructions to runway traffic which in turn required the development of pendant supports which presented an easily traversable low profile with the runway surface or which could be raised and lowered above and below the runway surface.

SUMMARY OF THE INVENTION

Accordingly, it is an object of this invention to provide a retractable pendant support that is movable to and from a flush position with the runway surface. It is a further object of this invention to provide a retractable pendant support which is fail safe, rugged and which can be securely locked in the battery (UP) position and in the DOWN position. These and other objects of the invention are accomplished as follows.

An oblong housing is embedded within a concrete runway such that the top surface of the housing is flush with the runway surface. A portion of the top surface of the housing is formed from an oblong rotatable table arranged to pivot 180° to either of two positions.

An elongated pendant support is fixedly secured to one horizontal surface of the rotatable table. The opposite horizontal surface of the rotatable table is smooth. At its midline the table is secured to a shaft having a pinion thereon which mates with a rack mounted on a movable table carriage. As the table carriage moves in a first direction the rotatable table pivots 180° to thereby position the smooth surface flush with the runway surface and to thereby position the pendant carrying surface within the housing underneath the runway surface; movement of the table carriage in the opposite direction pivots the table 180° in the reverse direction. A locking pin is fixedly mounted adjacent one of the vertical sides of the rotatable table. The locking pin is arranged for horizontal movement into and out of engagement with a horizontal bore provided on each vertical side of the rotatable table. The locking pin is normally urged into the bore by a bias spring and is urged from the bore by a cam. The cam is mounted on a shaft having a pinion thereon which mates with a rack mounted on a movable cam-carriage. An elongated drive shaft is connected at one end to the cam carriage. The drive shaft has a laterally disposed drive pin midway its ends which is arranged to engage a slot in the table carriage. The drive shaft is arranged for linear translational motion by means of an air cylinder or other suitable linear motion device. As the drive shaft translates in a first direction, the cam carriage moves to thereby rotate the cam which urges the locking pin out of the table bore. Thereafter the drive pin operatively engages the slot in the table carriage to thereby rotate the table pinion which pivots the table 180°. When the table has rotated 180°, the cam allows the locking pin to enter the bore to thereby secure the table and the pendant support in the battery position.

Other objects, advantages and novel features of the invention will become apparent from the following detailed description of the invention when considered in conjunction with the accompanying drawings.

DESCRIPTION OF THE PREFERRED EMBODIMENT

Figure 1:
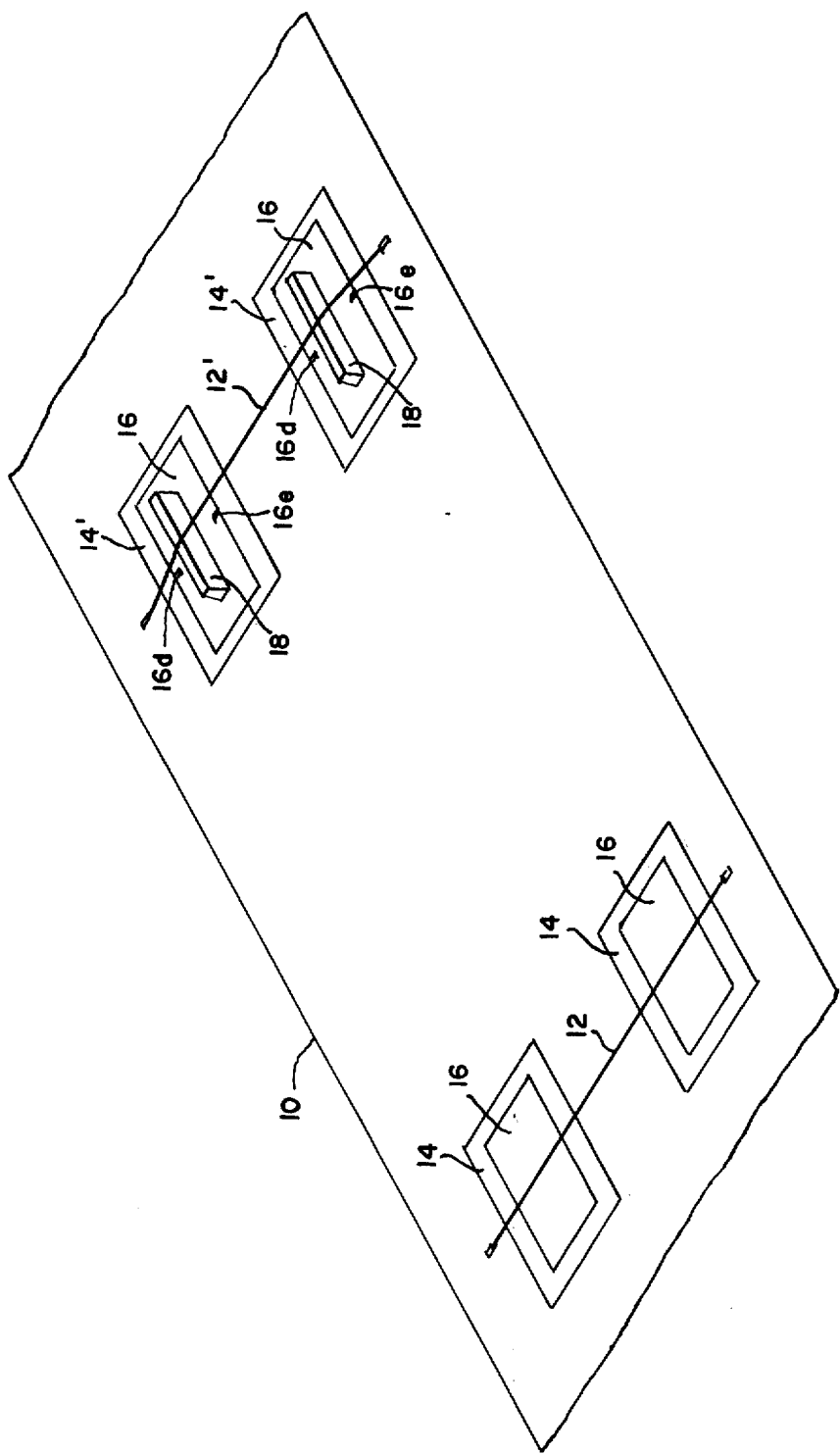
FIG. 1 is an exaggerated view of a portion of a landing surface showing pendants supported by pendant supports constructed in accordance with the invention.

Referring to FIG. 1, part of a landing surface e.g. a runway 10, is shown spanned by a plurality of identical pendants 12, 12'. Each pendant 12 is a wire cable. Each pendant 12 is secured at its respective ends to an energy absorber (not shown) which halts the translational movement of the pendant 12 after the pendant 12 has been engaged by an arresting hook of a landing aircraft. The runway 10 is provided with a plurality of rectangular shaped openings each adapted to receive identical pendant support housings 14, 14'. As described more fully hereinbelow, each pendant support housing 14 contains a rotatable table 16 which can be pivoted to either of two positions. In the first position the rotatable table 16 presents a flush aspect with respect to the surrounding runway 10 and the pendant 12 lies flat against the runway 10. In the second position, the rotatable table 16 raises a pendant support 18 above the surface of the runway 10 so as to elevate the pendant 12' above the runway surface to allow a landing aircraft arresting hook to more easily engage the pendant 12'. FIG. 1 has been drawn to reflect the two working positions of the rotatable table 16.

Figure 2:
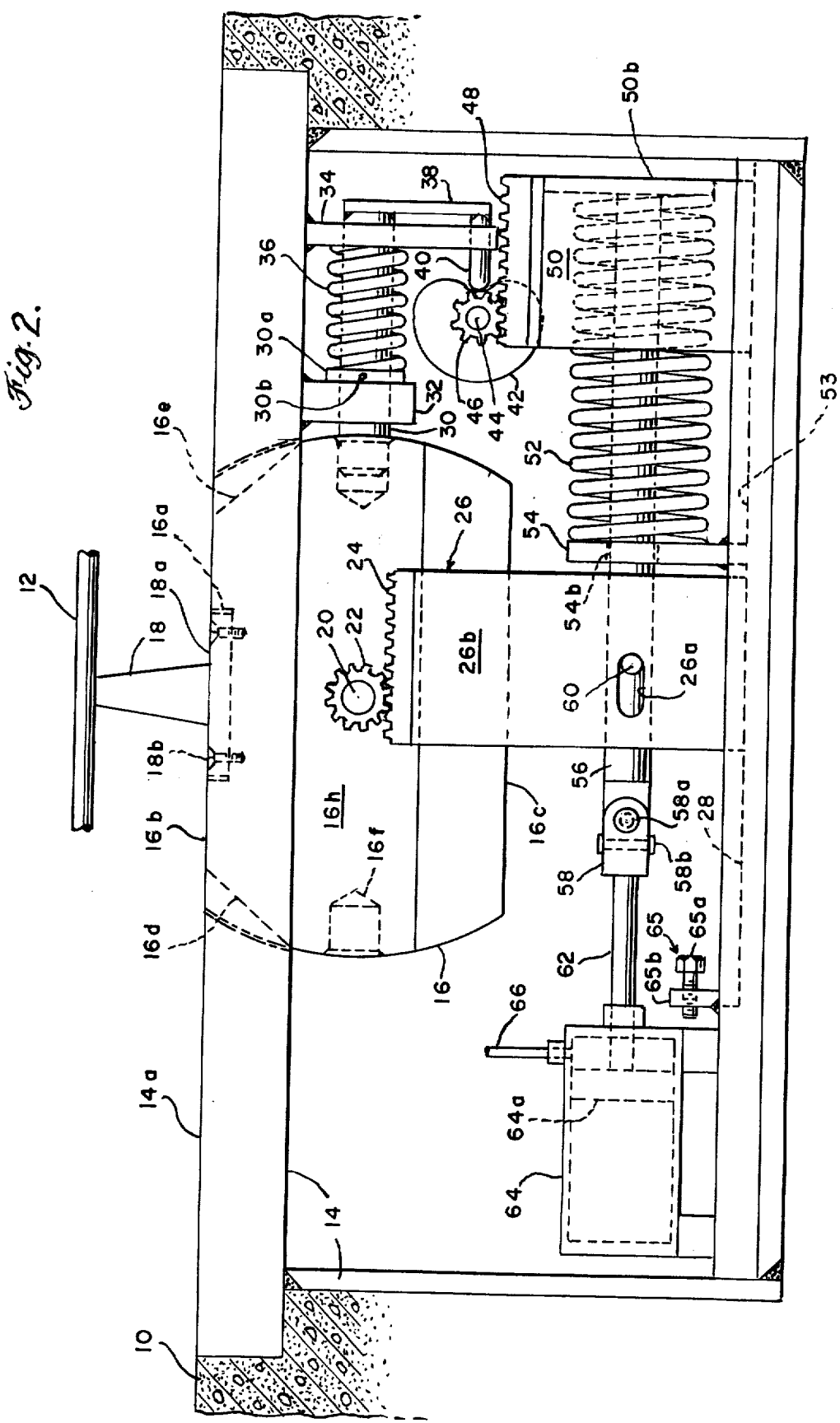
FIG. 2 is an elevational view of a pendant support constructed in accordance with the invention.

Referring to FIG. 2, the pendant support housing 14 is shown embedded beneath the runway 10; the roof 14a of the housing 14 is flush with the surface of the runway 10. One of the housing 14 side panels has been removed to reveal the operating elements which repose within the confines of the housing 14. The pendant support 18 is shown in the UP or battery position in which position it maintains the pendant 12 above the surface of the runway 10. All of the operating elements depicted in FIG. 2 are shown in the positions they are required to occupy when the pendant support 18 is in the battery position. As will be explained more fully hereinbelow, the operating elements are arranged to automatically return the pendant support 18 to the battery position upon power failure, i.e., the present invention operates in a fail-safe manner.

The housing 14 is fabricated from a high strength material such as steel or aluminum. The pendant support 18 is elongated and has a substantially trapazoidal cross-section; the pendant support is preferably elastic and flexible so as to yield without breaking if engaged by aircraft wheels. The pendant support 18 is fabricated from a suitable rubber, polyurethane or equivalent material. The base 18a of the pendant support extends beyond the base of the trapazoidal cross-section and is arranged to repose within a retaining recess 16a in the rotatable table 16. The pendant support 18 is secured to the rotatable table 16 by a plurality of bolts 18b or other suitable means.

The rotatable table 16 is fabricated from heavy gauge aluminum or other suitable material. The table 16 is an elongated body formed with an upper portion 16b and a lower portion 16c wherein each said portion 16b, 16c has a thickness equal to the thickness of the roof 14a of the pendant support housing 14. The upper portion 16b of table 16 carries the pendant support 18; the lower portion 16c is smooth and free of obstructions. Intermediate its length each arcuate side of the upper portion 16b is provided with oppositely disposed and inclined grooves 16d, 16e. The grooves 16d, 16e extend from the bottom to the top of the upper portion 16b and are inclined at an angle of approximately 50° with respect to the horizontal. As will be explained hereinbelow, each groove 16d, 16e is made wide enough to accommodate sliding contact with a locking pin 30. The mid-portion 16h of the table 16 is provided with two diametrically opposite bores 16f, 16g which accommodate the locking pin 30 as will be explained more fully hereinbelow. The mid-section 16h of the table is fixedly secured to a rotatable spindle 20 having ends journaled into the housing 14 for rotation.

The spindle 20 has a pinion 22 mounted thereon which mates with a complementary rack 24 which is secured to the top surface of a movable table carriage 26. The base of the table carriage 26 includes two separated side panels 26b each provided with an elongated slot 26a in their respective lower portions. The side panels 26b lie in planes parallel to the plane of the drawing. (Additional side panels disposed in planes perpendicular to the plane of the drawing may also be used provided such additional panels are bored or foreshortened to allow free motion of a connective shaft 56 as explained hereinbelow.) The slots 26a accommodate a drive pin 60 which supplies the motive force to the table carriage 26 as explained hereinbelow. (In addition the length of the slots 26a must be such as to allow free motion of the drive pin 60 until a cam 42 has rotated approximately 180° as explained hereinbelow). The bottoms of the table carriage 26 side panels 26b are dovetailed within parallel and elongated guide tracks 28 which serve to guide the table carriage 26 as it moves linearly to the left and to the right.

With further reference to FIG. 2, a locking pin 30 is shown with an end inserted into the bore 16g. With the locking pin 30 in this posture, the table 16 is locked into the battery position. The locking pin 30 is slidably supported by two mountings 32, 34 fixedly secured to the underside of the roof 14a of the pendant support housing 14. The locking pin 30 is provided with a collar 30a which provides an abutment surface for a pin return spring 36. The pin return spring 36 is biased to urge the locking pin 30 to the left. The collar 30a may be fixedly secured to the locking pin or it may be adjustably secured thereto with a set screw 30b to allow adjustments for the tension of pin return spring 36. The locking pin 30 is required to withstand vertically directed shear forces which are generated as an aircraft wheel traverses the table 16. In one embodiment a sufficiently rugged locking pin was fabricated from 1¼ inch diameter alloy steel (4330).

A vertically disposed butt plate 38 is fixedly secured to the other end of the locking pin 30 and extends downwardly to a cam follower 40. The cam follower 40 reposes within a bore in the support 34 and is fixedly secured to butt plate 38. Alternatively the cam follower 40 may be adjustably secured to the butt plate 38 (by a conventional screw and thread arrangement, for example) to compensate for minor mispositioning of the cam 42 and its spindle 44. The locking pin 30, the butt plate 38 and the cam follower 40 are secured to each other so as to move in unison to the left under the dominant influence of the pin return spring 36 and to move in unison to the right under the dominant influence of the cam 42.

A substantially cardioid shaped cam 42 is fixedly secured to a spindle 44 which has a cam pinion 46 mounted thereon. (The cardioid shaped cam 42 reduces deleterious side forces on the cam follower 40). The spindle 44 has ends journaled into the housing 14 for support and rotation. The cam pinion 46 mates with a complementary rack 48 carried by a linearly movable cam-rack carriage 50. The cam-rack carriage 50 is a three sided housing wherein two sides are disposed in planes parallel to the plane of the drawing and the lower portion of these two sides are dovetailed within parallel guide tracks 53; the remaining side is disposed in a plane perpendicular to the plane of the drawing and forms a shortened rear wall 50b of the cam-rack carriage 50.

A cam return spring 52 has one end fixedly secured to the rear wall 50b of the cam-rack carriage 50 and the other end fixedly secured to a spring stop 54. The cam return spring 52 urges the cam-rack carriage 50 to the right after the cam-rack carriage has been moved to the left as explained hereinbelow. A connection shaft 56 has one end fixedly secured to the rear wall 50b of the cam-rack carriage 50 and the other end fixedly secured to a clevis 58 by means of a pin 58a. The connection shaft 56 is provided with a radially extending drive pin 60 which is arranged to repose within and engage the elongated slots 26a in the table carriage 26 side panels 26b. A rod 62 has one end connected to the clevis 58 by means of a pin 58b and the other end fixedly secured to a movable piston 64a located within a conventional air cylinder 64 fixedly secured to the base of the housing 14. The air cylinder 64 is provided with 50 to 100 psi air pressure via feedline 66 from a controllable pressurized source (not shown).

With further refererence to FIG. 2, the invention operates to rotate the pendant support 18 180° from the position shown in FIG. 2 as follows. Air pressure is supplied and maintained to the air cylinder 64 via the feedline 66 from a source of pressurized air (not shown). Under the influence of the air pressure, the piston 64a moves to the left carrying with it the rod 62, the connection shaft 56 and the cam-rack carriage 50. (The table-rack carriage 26 is stationary at this time). As the camrack carriage moves to the left, the return spring 52 is compressed and the cam 42 rotates clockwise. When the cam 42 rotates 180° to point A, the locking pin 30 is fully retracted from the bore 16g, the pin return spring 36 is compressed and the drive pin 60 has traversed the length of the slots 26a to thereby operatively engage the left wall of said slots 26a. As the cam 42 continues to rotate clockwise beyond 180° (point A), the table carriage 26 is moved by the drive pin 26a and the table 16 rotates clockwise in angular unison with the cam 42. When the cam 42 has rotated 270° the locking pin 30 is still in the fully retracted position and the table has rotated 90° clockwise. After the cam 42 has rotated approximately 295° and the table has rotated approximately 115°, the locking pin 30 begins to move to the left; it should be noted that at a table angle of 115°, the center line of the pendant support 18 is below the center line of the locking pin 30. After the cam 42 has rotated approximately 325° and the table has rotated approximately 145°, the locking pin 30 is in sliding engagement with the table groove 16d. Thereafter the cam 42 rotates from 325° to 360° while the locking pin 30 is urged into sliding contact with the table groove 16d and the arcuate side of the table mid section 16h. When the cam 42 has rotated approximately 360° and the table 16 has rotated approximately 180° the pin return spring 36 urges the locking pin 30 into the table bore 16f to thereby lock the table in the down position.

The cam 42 is prevented from rotating more than 360° in the clockwise direction by stopping the leftward movement of carriage 26 by means of an adjustable stop 65 secured at the ends of the guide tracks 28; each stop 65 includes a screw 65a threadably secured to an upright 65b. Excess rotation of the cam 42 in the counterclockwise direction is prevented by arresting the rightward movement of either the table carriage 26 or the cam-rack carriage 50 by means of adjustable stops (not shown) like stop 65 inserted into either pair of guide tracks 28 or 53 or by so sizing the device that spring stop 54 acts as the stop for the rightward movement of the table carriage 26.

The pendant support 18 will remain in the DOWN position so long as air pressure is supplied to the air cylinder. Should air pressure be accidentally or intentionally removed, the compressed cam-return spring 52 will automatically return the pendant support to the UP position by moving the cam-rack carriage 50 and the table rack carriage 26b to the right in a sequence converse to that set forth above. The invention is thus fail safe. Normal return of the pendant support 18 to the battery position is also accomplished by removing the air supply to cylinder 64.

It should be clear from the foregoing disclosure that any conventional linear motion device may be employed in lieu of the air cylinder 64; that a plurality of locking pins 30 and cams 42 may be employed on the single spindle 44; and that the ratio between pinion 46 and pinion 22 may be other than 1:1.

Obviously, many modifications and variations of the present invention are possible in the light of the above teachings. It is therefore to be understood that within the scope of the appended claims the invention may be practiced otherwise than as specifically described.

I claim:

1. Apparatus for raising and lowering an aircraft arresting pendant from and to a runway surface comprising:
   a rotatable table having first and second horizontal surfaces;
   a pendant support secured to said first table surface;
   motive means operatively connected to said table for pivoting said table between a first position wherein said first table surface is coplanar with said runway surface and a second position wherein said second table surface is coplanar with said runway surface;
   bias means operatively connected to said motive means for normally urging said table to said first position.

2. The apparatus according to claim 1 further including:
   locking means operating connected to said bias means and to said motive means for locking said table in said first or second position.

3. Apparatus for raising and lowering an aircraft arresting pendant from and to a runway surface comprising:
   a housing embedded beneath the surface of the runway, said housing provided with a roof having a channel therein;
   a rotatable table pivotally secured to said housing within said channel, said table having first and second surfaces;
   a pendant support secured to said first table surface;
   first motive means operatively connected to said table for rotating said table between first and second positions to thereby position said first surface coplanar with said runway surface when said table is in said first position and to thereby position said second surface coplanar with said runway surface when said table is in said second position;
   locking means slidably secured within said housing for locking said table in either said first or second position;
   second motive means operatively connected to said locking means for urging said locking means from and to a table locking position; and
   means normally urging said table to said first position.

4. Apparatus for raising and lowering an aircraft arresting pendant from and to a runway surface comprising:
   a housing embedded beneath the surface of the runway, said housing provided with a roof having a channel therein;
   a rotatable table pivotally secured to said housing within said channel, said table having first and second surfaces;
   a pendant support secured to said first table surface;
   first gear means operatively connected to said table for rotating said table between first and second positions wherein said first table surface is coplanar with said runway surface when said table is in said first position and said second table surface is coplanar with said runway surface when said table is in said second position;
   first gear carriage means operatively connected to said first gear means for moving said first gear means;
   locking means slidably secured within said housing for movement to and from a table locking position;
   first bias means operatively connected to said locking means for urging said locking means to said table locking position;
   second bias means operatively connected to said locking means for urging said locking means from said locking position;
   second gear means operatively connected to said second bias means for moving said second bias means;

second gear carriage means operatively connected to said second gear means for moving said second gear means;

motive means connected to said second gear carriage means for moving said second gear carriage means to and from a rest position;

third bias means connected to said second gear carriage means for normally urging said second gear carriage means toward said rest position; and engagement means connected to said motive means for engaging and moving said first gear carriage means after said second gear carriage means has moved a predetermined distance from said rest position and after said second gear carriage means has moved a predetermined distance toward said rest position.

* * * * *